United States Patent
Gardner

(10) Patent No.: US 7,257,165 B2
(45) Date of Patent: Aug. 14, 2007

(54) METHOD AND APPARATUS FOR PREAMBLE DETECTION AND TIME SYNCHRONIZATION ESTIMATION IN OFDM COMMUNICATION SYSTEMS

(76) Inventor: Steven H. Gardner, 4423 Alhambra St., San Diego, CA (US) 92107

(*) Notice: Subject to any disclaimer, the term of this patent is extended or adjusted under 35 U.S.C. 154(b) by 809 days.

(21) Appl. No.: 10/418,748

(22) Filed: Apr. 17, 2003

(65) Prior Publication Data

US 2004/0001430 A1    Jan. 1, 2004

Related U.S. Application Data

(60) Provisional application No. 60/373,457, filed on Apr. 18, 2002.

(51) Int. Cl.
*H04K 1/10* (2006.01)
*H04L 27/28* (2006.01)

(52) U.S. Cl. ............ 375/260; 375/150; 375/512; 375/516; 370/210; 370/208; 370/203

(58) Field of Classification Search ............ 375/260, 375/150; 370/512, 516, 203, 208, 210
See application file for complete search history.

(56) References Cited

U.S. PATENT DOCUMENTS

| | | | |
|---|---|---|---|
| 6,785,350 B1 * | 8/2004 | Poulbere et al. | 375/343 |
| 7,058,151 B1 * | 6/2006 | Kim | 375/355 |
| 7,110,349 B2 * | 9/2006 | Branlund et al. | 370/203 |
| 2001/0015988 A1 * | 8/2001 | Sawada et al. | 370/512 |
| 2002/0126764 A1 * | 9/2002 | Murakami et al. | 375/295 |
| 2003/0072256 A1 * | 4/2003 | Kim | 370/208 |

* cited by examiner

*Primary Examiner*—Jean B. Corrielus
*Assistant Examiner*—Nader Bolourchi

(57) ABSTRACT

A novel method and apparatus for preamble detection and time synchronization estimation in OFDM communication systems is described. The present invention can be easily implemented to provide preamble detection and highly accurate time synchronization estimations. The inventive method and apparatus utilizes phase and magnitude information obtained from a received signal to detect a preamble and to calculate a time synchronization estimation for the received signal.

31 Claims, 9 Drawing Sheets

METHOD AND APPARATUS FOR PREAMBLE DETECTION AND TIME SYNCHRONIZATION ESTIMATION IN OFDM COMMUNICATION SYSTEMS

RELATED APPLICATIONS

This present application is related to a provisional application Ser. No. 60/373,457 filed on Apr. 18, 2002, entitled "Method and Apparatus for Preamble Detection and Time Synchronization Estimation in OFDM Communication Systems", by Gardner, currently pending, for which the priority date for this application is hereby claimed.

FIELD OF THE INVENTION

This invention relates to multiple access networks, and more particularly to a method and apparatus for preamble detection and time synchronization estimation in Orthogonal Frequency Division Multiplexing (OFDM) communication systems.

BACKGROUND OF THE INVENTION

The past few years have brought about tremendous changes in the modern home, and especially, in appliances and other equipment designed for home use. For example, advances in personal computing technologies have produced faster, more complex, more powerful, more user-friendly, and less expensive personal computers (PCs) than previous models. Consequently, PCs have proliferated and now find use in a record number of homes. Indeed, the number of multiple-PC homes (households with one or more PCs) is also growing rapidly. Over the next few years, the number of multiple-PC homes is expected to grow at a double-digit rate while the growth from single-PC homes is expected to remain flat. At the same time, the popularity and pervasiveness of the well-known Internet has produced a need for faster and less expensive home-based access.

As is well known, usage of the Internet has exploded during the past few years. More and more often the Internet is the preferred medium for information exchange, correspondence, research, entertainment, and a variety of other communication needs. Not surprisingly, home-based Internet usage has also increased rapidly in recent years. A larger number of homes require access to the Internet than ever before. The increase in home Internet usage has produced demands for higher access speeds and increased Internet availability. To meet these needs, advances have been made in cable modem, digital subscriber loop (DSL), broadband wireless, powerline local loop, and satellite technologies. All of these technologies (and others) are presently being used to facilitate home-based Internet access. Due to these technological advances and due to the ever-increasing popularity of the Internet, predictions are that home-based Internet access will continue to explode during the next decade. For example, market projections for cable modem and DSL subscriptions alone show an imbedded base of approximately 35 million connected users by the year 2003.

In addition to recent technological advances in the personal computing and Internet access industries, advances have also been made with respect to appliances and other equipment intended for home use. For example, because an increasing number of people work from home, home office equipment (including telecommunication equipment) has become increasingly complex and sophisticated. Products have been developed to meet the needs of the so-called SOHO ("small office, home office") consumer. While these SOHO products tend to be less expensive than their corporate office product counterparts, they do not lack in terms of sophistication or computing/communication power. In addition to the increasing complexity of SOHO products, home appliances have also become increasingly complex and sophisticated. These so-called "smart" appliances often use imbedded microprocessors to control their functions. Exemplary smart appliances include microwaves, refrigerators, dishwashers, washing machines, dryers, ovens, etc. Similar advances have been made in home entertainment systems and equipment such as televisions (including set-top boxes), telephones, videocassette recorders (VCRs), stereos, etc. Most of these systems and devices include sophisticated control circuitry (typically implemented using microprocessors) for programming and controlling their functions. Finally, many other home use systems such as alarm systems, irrigation systems, etc., have been developed with sophisticated control sub-components.

The advances described above in home appliance and equipment technologies have created a need for similar advancements in home communication networking technology. As home appliances and entertainment products become increasingly more complex and sophisticated, the need has arisen for facilitating the interconnection and networking of home appliances and other products used in the home.

One exemplary home-based communication system is commonly referred to as "Powerline Networking". Powerline Networking refers to the concept of using existing residential AC power lines as a means for networking all of the appliance and products used in the home. Although the existing AC power lines were originally intended for supplying AC power only, the Powerline Networking approach anticipates also using home power lines for communication networking purposes. One such proposed powerline networking approach is shown in the block diagram of FIG. 1.

As shown in FIG. 1, the powerline network 100 includes a plurality of power line outlets 102 electrically coupled to one another via a plurality of power lines 104. As shown in FIG. 1, a number of devices and appliances are coupled to the powerline network via interconnection with the plurality of outlets 102. For example, a personal computer 106, laptop computer 108, telephone 110, facsimile machine 112, and printer 114 are networked together via electrical connection with the power lines 104 through their respective and associated power outlets 102. In addition, "smart" appliances such as a refrigerator 115, washer dryer 116, microwave 118, and oven 126 are also networked together using the powerline network 100. A "smart" television 122 is networked via electrical connection with its respective power outlet 102. Finally, as shown in FIG. 1, the powerline network can access an Internet Access Network 124 via interconnection with a modem 126 or other Internet access device.

With multiple power outlets 102 in almost every room of the modern home, the plurality of power lines 104 potentially comprises the most pervasive in-home communication network in the world. The powerline network system is available anywhere power lines exist (and therefore, for all intents and purposes, it has worldwide availability). In addition, networking of home appliances and products is potentially very simple using powerline networking systems. Due to the potential ease of connectivity and installation, the powerline networking approach will likely be very attractive to the average consumer. However, powerline networking systems present a number of difficult technical challenges. In order for powerline networking systems to gain acceptance, these challenges will need to be overcome.

To appreciate the technical challenges presented by powerline networking systems, it is helpful to first describe some of the electrical characteristics unique to home powerline networks. As is well known, home power lines were not originally designed for communicating data signals. The physical topology of the home power line wiring, the physical properties of electrical cabling used to implement power lines, the types of appliances typically connected to the power lines, and the behavioral characteristics of the current that travels on the power lines all combine to create technical obstacles to using power lines as a home communication network.

The power line wiring used within a house is typically electrically analogous to a network of transmission lines connected together in a large tree-like configuration. The power line wiring has differing terminating impedances at the end of each stub of the network. As a consequence, the transfer function of the power line transmission channel has substantial variations in gain and phase across the frequency band. Further, the transfer function between a first pair of power outlets very often differs from that between a second pair of power outlets. The transmission channel tends to be fairly constant over time. Changes in the channel typically occur only when electrical devices are plugged into or removed from the power line (or occasionally when the devices are powered on/off). When used for networking devices in a powerline communications network, the frequencies used for communication typically are well above the 60-cycle AC power line frequency. Therefore, the desired communication signal spectrum is easily separated from the power-bearing signal in a receiver connected to the powerline network.

Another important consideration in the power line environment is noise and interference. Many electrical devices create large amounts of noise on the power line. The powerline networking system must be capable of tolerating the noise and interference extent on home power lines. Some home power line interference is frequency selective. Frequency selective interference causes interference only at specific frequencies (i.e., only signals operating at specific frequencies are interfered with, all other signals experience no interference). In addition, some home power line interference is impulsive by nature. Although impulsive interference spans a broad range of frequencies, it occurs only in short time bursts. Some home power line interference is a hybrid of these two types of interference (frequency selective and impulsive). In addition to the different types of interference present on home power lines, noise is neither uniform nor symmetric across the power lines.

An important aspect of any home powerline networking system specification is the definition of the modulation protocol that is used by the powerline networking systems to efficiently transmit information between transmitters and receivers. A basic powerline networking system transmitter and receiver are now described with reference to FIGS. 2a and 2b.

FIG. 2a shows a simplified block diagram of a basic powerline networking transmitter 30. As shown in FIG. 2a, the basic powerline networking transmitter 30 includes a data source 32, a modulation operations stage 34, and a line driver and power line coupler stage 36. The data source 32 generates either an analog or digital data signal (depending on the networking system used) and provides the data signal as input to the modulation operations stage 34. The modulation operations stage 34 inputs a modulated signal to the line driver and power line coupler stage 36. The power line coupler stage 36 outputs an amplified modulated signal to a powerline network (e.g., power lines).

FIG. 2b shows a simplified block diagram of a basic powerline networking receiver 40. As shown in FIG. 2b, the basic powerline networking receiver 40 includes a power line coupler and AGC (automatic gain control) stage 42, a demodulation operations stage 44, and a data sink 46. The power line coupler and AGC stage 42 obtains inputs from a modulated signal (not shown) provided on a powerline network and inputs the modulated signal to the demodulation operations stage 44. The demodulation operations stage 44 demodulates the modulated signal and inputs a data signal to the data sink 46. The demodulation technique used by the demodulation operations stage 44 depends upon the modulation technique used by the modulation operations stage 34.

Referring again to FIG. 2a, the modulation operations stage 34 modulates the data signal by performing a series of modulation operations to the data signal. Several different modulation techniques are well known in the digital communications art. Examples of modulation techniques include amplitude modulation (AM) and frequency modulation (FM, FSK, BPSK, QPSK, etc.). The type of modulation techniques used by the modulation operations stage 34 depends upon the operating environment of the powerline networking system.

In powerline networks, power line channels are highly frequency-selective, with both the gain and the phase of the channels varying substantially over the frequency band. Thus, single carrier modulation techniques are ill suited for powerline networks because they require complex adaptive equalizers necessary to compensate for the channel. Consequently, multi-carrier modulation (MCM) techniques are well suited for powerline networking systems.

Orthogonal Frequency Division Multiplexing (OFDM) is an example of an MCM technique that is well suited for powerline networking systems. OFDM is well suited for powerline networking environments because with multiple carriers being used, the channel is essentially flat across the entire band of each carrier. Advantageously, no equalization is required in order to recover a signal when individual carriers use differential phase modulation.

OFDM modulation techniques are well known in the modulation design art as exemplified by their description in an article entitled "Multicarrier Modulation for Data Transmission: An Idea Whose Time Has Come", by John A. C. Bingham, published in IEEE Communications Magazine at pages 5-14, in May 1990, the text of which is hereby fully incorporated by reference herein for its teachings on data transmission and modulation techniques. Typical OFDM systems generate transmitted waveforms using Inverse Fast-Fourier Transforms (IFFT). The modulation of each carrier uses rectangular pulses, and thus, the entire OFDM time domain waveform can be created by simply setting an appropriate amplitude and phase for the points in the frequency domain (or tones) that correspond to each carrier, and by implementing the IFFT to create a time domain waveform. The time duration of this time domain waveform is equal to the inverse of the frequency spacing between the tones. The term "OFDM symbol" is typically used to denote the time domain waveform that results from a single IFFT operation. Typical OFDM systems transmit OFDM symbols sequentially (i.e., one symbol after another), and optionally transmit overhead signaling between the OFDM symbols.

One aspect of the OFDM modulation techniques is that carriers are "orthogonal". The carriers are orthogonal because each carrier has an integer number of periods in the time interval that is generated by the IFFT. The orthogonal characteristic of OFDM modulation allows OFDM receivers to perform Fast-Fourier Transform (FFT) computations that yield the original data bits without creating intersymbol interference.

OFDM modulation techniques transmit data by dividing a data stream into several parallel bit streams. The bit-rate of each of these bit streams is much lower than the aggregate bit-rate of all of the streams. The bit streams are used to modulate several densely spaced and overlapping sub-carriers. Although the sub-carriers overlap in frequency spectrum, their orthogonal relation allows sufficient separation for demodulation purposes.

In a multiple access communication system, such as an OFDM home power line network, transmitters typically transmit only when data is queued (i.e., only when a transmitter has data to transmit). Receivers or modems used in such systems are known as "burst modems" because the communication system transmits information in data bursts (i.e., high volumes of data are transmitted during a relatively short time interval). A data burst comprises a frame structure including a preamble that precedes all other information. In typical OFDM systems, the preambles include two unique sets of OFDM symbols, wherein each set comprises two or more repeated OFDM symbols. These sets are preferably poorly correlated with each other. It is important that the burst modems rapidly detect the presence of a data burst, the correct start and stop times to be used for sampling the detected data burst, and the frame boundary of the detected data burst.

One approach at rapidly detecting the presence of data bursts uses a frequency-domain correlator to detect the preambles. The frequency-domain correlator (FDC) method relies upon the well-known observation that circularly time shifting a Discrete Fourier Transform (DFT) causes a phase change between a previously time-shifted DFT to a subsequently time-shifted DFT. The FDC method is a multiple-hypothesis technique because multiple possibilities (i.e., "hypotheses") are calculated and compared to a theoretical result.

The FDC method detects preambles by correlating (in the frequency domain) the phase of the received OFDM symbol with the phase of the transmitted OFDM symbol. Specifically, the FDC method calculates a phase for every possible circularly time-shifted combination of the DFT. The FDC method utilizes a 256-sample DFT, and thus the method calculates 256 phases. The method detects a preamble when a strong correlation occurs between any of the 256 possible phases and a theoretical phase. The time-shifted combination (i.e., one possible timing hypothesis out of 256) that produces the strongest correlation is used to correct the timing of subsequent OFDM symbols.

Unfortunately, the FDC approach has several disadvantages. First, the method is complex, and thus requires increased processing complexity. Second, the FDC method is limited because detection must balance two opposing goals: increasing detection probability and decreasing false alarms. These are opposing goals. Although raising the detection thresholds degrades detection probability and decreases a number of false alarms, lowering the detection thresholds increases both detection probability and the number of false alarms. Third, the FDC method suffers reduced detection accuracy because it does not use all available information from the transmitted signals (e.g., magnitude information). Fourth, the FDC method has limited accuracy regarding time synchronization because timing errors are limited by the spacing between hypotheses.

Therefore, a need exists for an improved method and apparatus for preamble detection and time synchronization estimation in OFDM communication systems. Specifically, a need exists for a method and apparatus that rapidly detects preambles and determines time synchronization in OFDM communication systems using data burst transmissions. Such a method and apparatus should be implemented in a simple manner that utilizes both phase and magnitude information. In addition, the method and apparatus should be capable of providing highly accurate timing synchronization estimations without using multiple-hypothesis techniques. The present invention provides such a preamble detection and time synchronization estimation method and apparatus.

SUMMARY OF THE INVENTION

The present invention is a method and apparatus for preamble detection and time synchronization estimation in OFDM communication systems. The present invention can be easily implemented to provide preamble detection and highly accurate time synchronization estimations. The inventive method and apparatus utilizes phase and magnitude information from a received signal to detect a preamble and calculate a time synchronization estimation.

An inventive OFDM receiver inputs a received signal and a plurality of reference samples H(n). The receiver generates a magnitude and a phase of a vector sum S and utilizes these values to detect a preamble and time synchronization estimation. In one embodiment, the present inventive receiver operates serially.

The present inventive preamble detection and time synchronization estimation method can be summarized as follows:
(a) perform multiple Fast Fourier Transforms (FFT) on a received signal to produce complex tone samples R(n);
(b) obtain reference samples H(n);
(c) compute a vector sum S in accordance with the following equation:

$$S = \sum_{n=1}^{M-1} R^*(n) \cdot R(n-1) \cdot H^*(n) \cdot H(n-1);$$

where,
M is the number of tones used by the communication system;
R*(n) is the complex conjugate of the nth frequency-domain sample;
R(n−1) is the (n−1)th frequency-domain sample represented by a complex value in rectangular format;
H*(n) is the complex conjugate of the nth reference sample;
H(n−1) is the (n−1)th reference sample;
(d) utilize magnitude and phase information of the vector sum S to detect a preamble and to estimate a time synchronization.

BRIEF DESCRIPTION OF THE DRAWINGS

The foregoing aspects are better understood from the following detailed description of one embodiment of the invention with reference to the drawings, in which:

FIG. 4b is a simplified block diagram of one embodiment of a difference vector multiplier used on the OFDM receiver of FIG. 4a;

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

Throughout this description, the preferred embodiment and examples shown should be considered as exemplars, rather than as limitations on the present invention.

The present invention is a method and apparatus for preamble detection and time synchronization estimation in OFDM communication systems. The present invention can be easily implemented to provide preamble detection and highly accurate time synchronization estimations. The method and apparatus uses phase and magnitude information obtained from a received signal to detect a preamble and to calculate a time synchronization estimate. Time synchronization estimations are determined from "timing errors" (i.e., elapsed time or time differences) timing errors (i.e., time elapsed or time difference) are measured between the beginning of sampling the received signal (e.g., performing an FFT) and the beginning of a preamble symbol. For example, the timing error is zero when the beginning of sampling of the received signal occurs simultaneously with the beginning of a preamble symbol. An exemplary OFDM communication system adapted for use with the present invention is now described.

Exemplary OFDM Communication System Adapted for Use with the Present Invention

Figure 1:
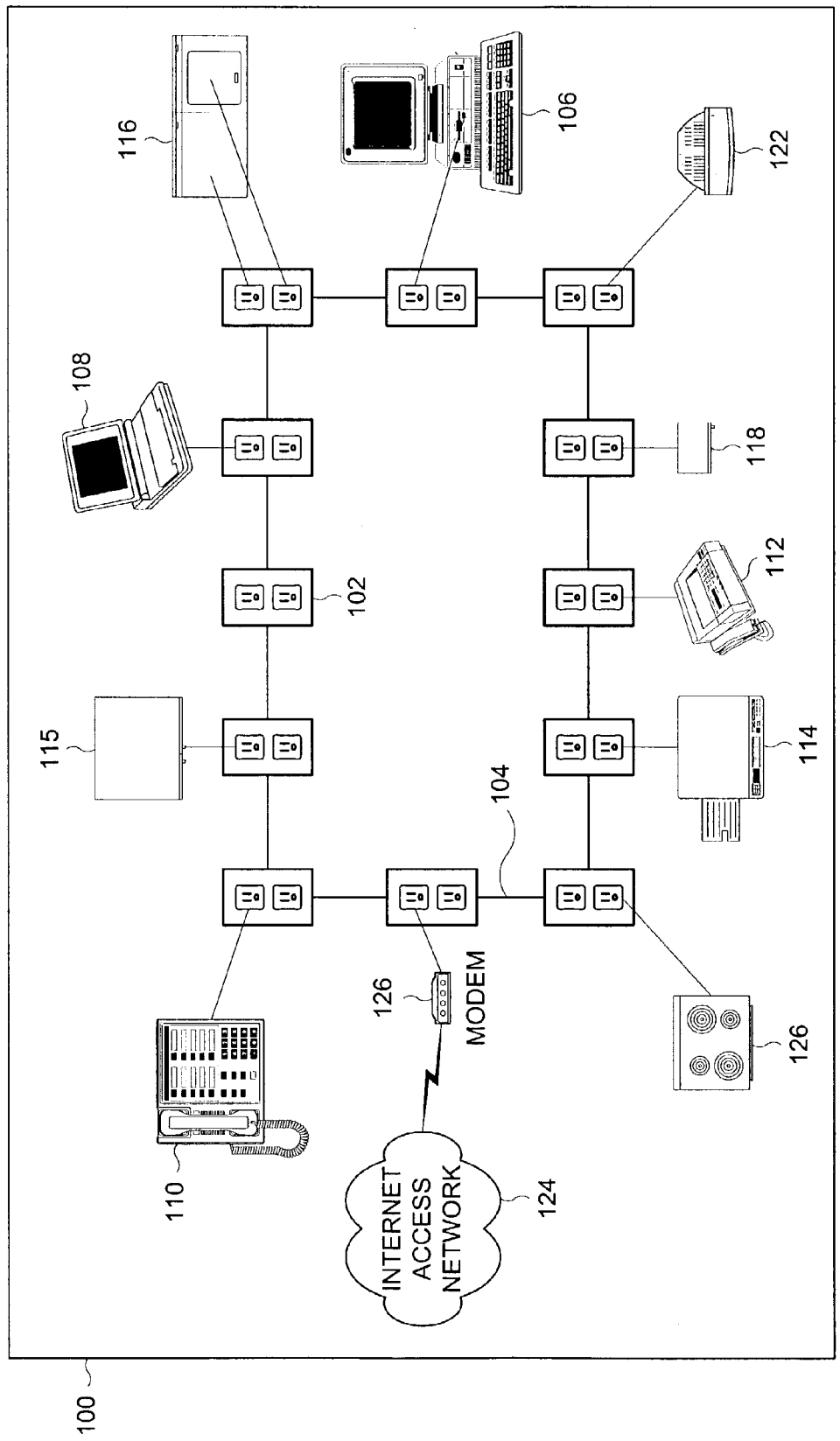
FIG. 1 is a block diagram of an exemplary powerline communications network.
Figure 2A:
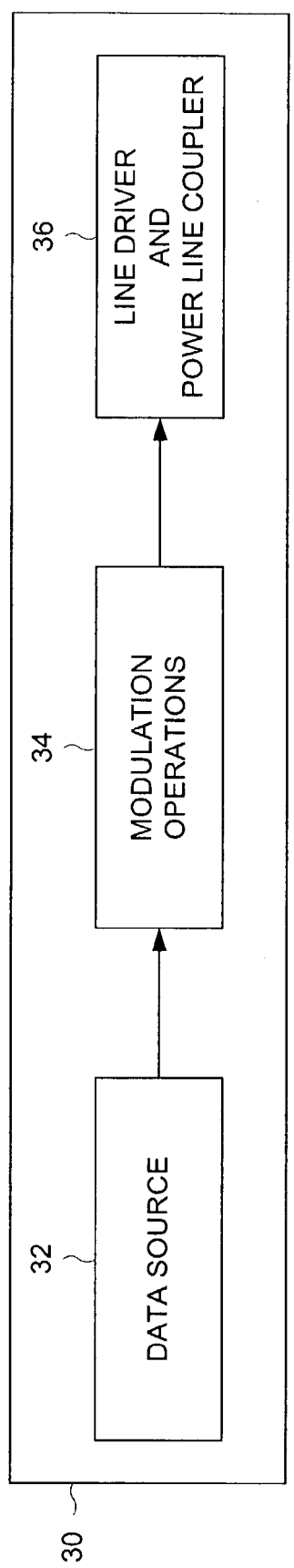
FIG. 2a is a simplified block diagram of a basic powerline networking transmitter.
Figure 2B:
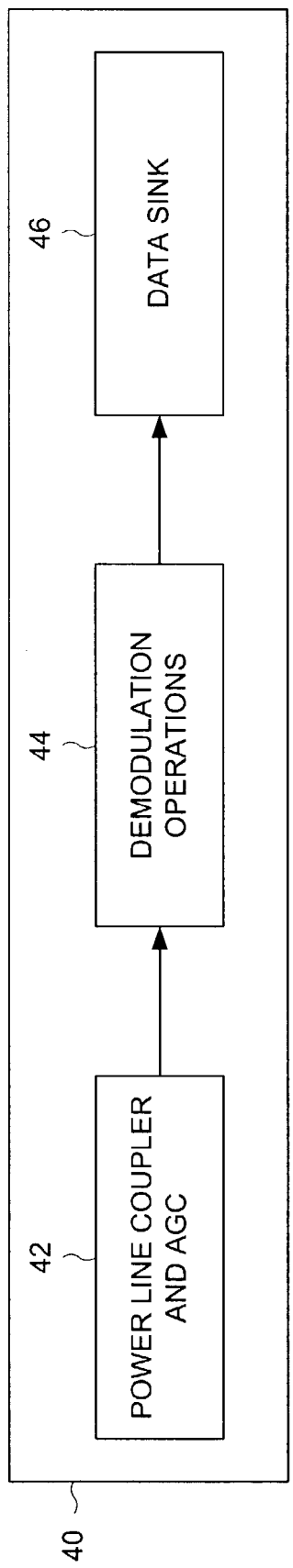
FIG. 2b is a simplified block diagram of a basic powerline networking receiver.
Figure 3:
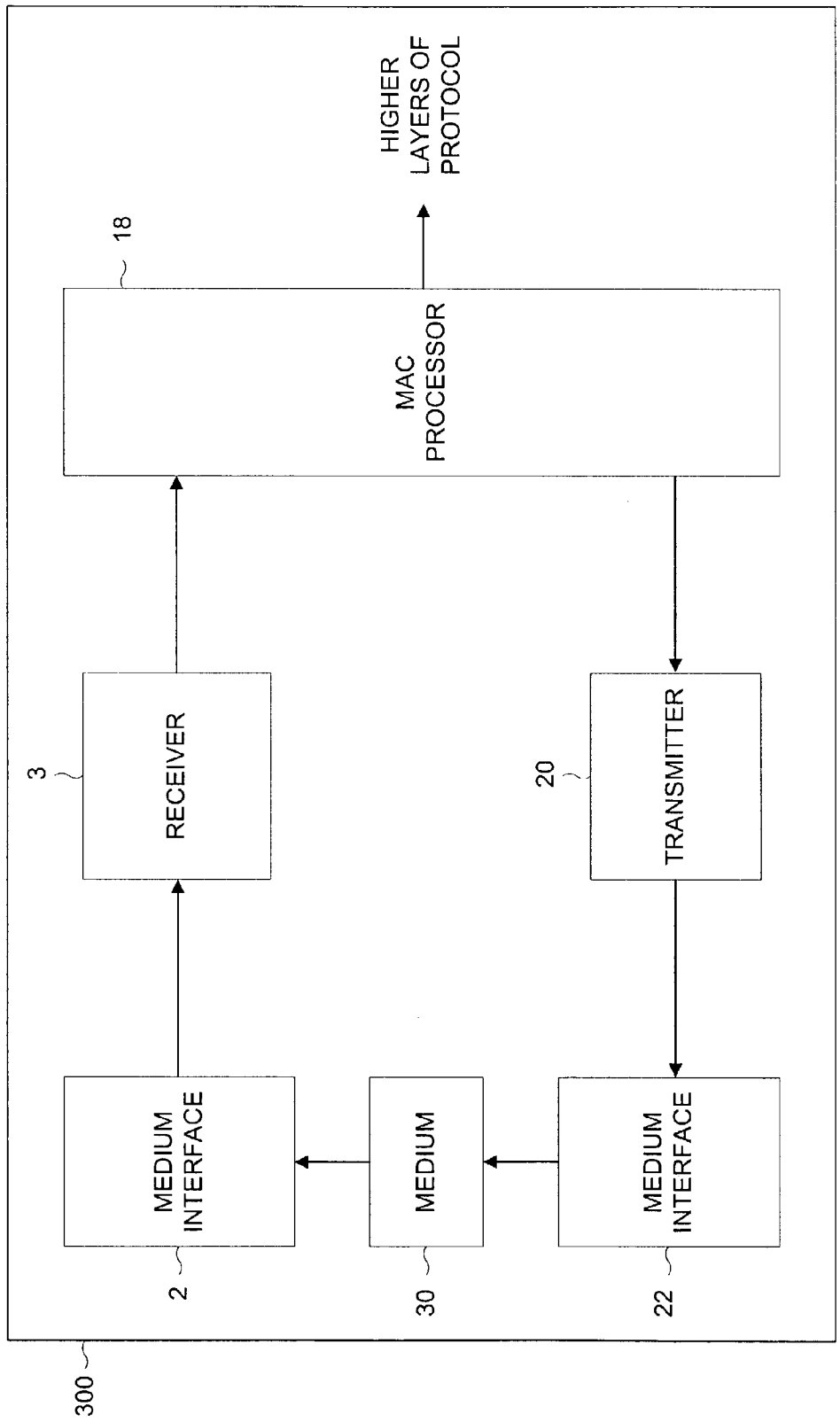
FIG. 3 is a simplified block diagram of one embodiment of an OFDM communication system adapted for use with the present invention.

FIG. 3 is a simplified block diagram of one embodiment of an OFDM communication system adapted for use with the present invention. The exemplary OFDM communication system utilizes OFDM modulation.

As shown in FIG. 3, the exemplary OFDM communication system 300 includes a first medium interface 2, a receiver 3, a MAC processor 18, a transmitter 20, a second medium interface 22 and a medium 30. The first and second medium interfaces 2, 22, respectively, couple the medium 30 to the receiver 3 and transmitter 20, respectively. In a home powerline embodiment, the first and second medium interfaces 2, 22 comprise power line couplers and the medium 30 comprises a power line. The transmitter 20 transmits a transmitted signal using the medium 30. The first medium interface 2 inputs a received signal to the receiver 3.

As described below in more detail with reference to the descriptions of FIGS. 4-5, the receiver 3 identifies if a transmitted signal is present at its input. The receiver uses magnitude information derived from reference samples and received signals to detect the presence of preambles. The receiver also uses phase information to produce time synchronization estimates for the detected preambles. The time synchronization estimates are used to assist in demodulation of the received signals. As shown in FIG. 3, the receiver 3 inputs demodulated and decoded data, and information related to the preamble and timing error, to the MAC processor 18. The MAC processor 18 outputs the demodulated/decoded signals (e.g., the wanted data signal) to higher layers of communications protocol.

The transmitter 20 transmits a transmitted signal to the receiver 3 via the first and second medium interfaces 2, 22 and the medium 30. The transmitter 20 outputs a transmitted signal to the second medium interface 22. A first embodiment of the receiver 3 is now described in more detail.

Figure 4A:
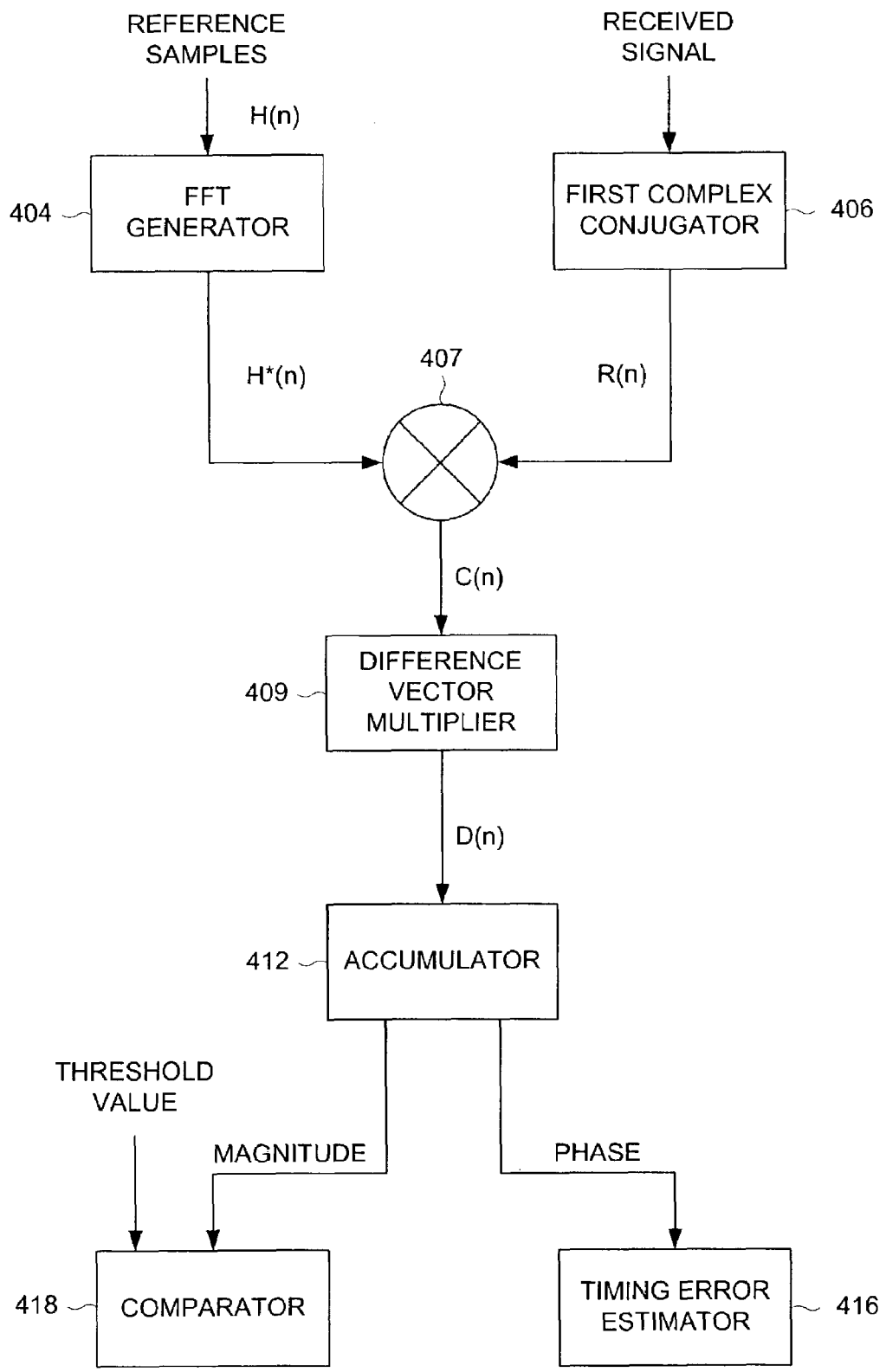
FIG. 4a is a simplified block diagram of a first embodiment of an OFDM receiver made in accordance with the present invention.

FIG. 4a is a simplified block diagram of a first embodiment 400 of the present inventive OFDM receiver 3 (FIG. 3) adapted for use with the present invention. As shown in FIG. 4a, the first embodiment 400 of the receiver 3 includes an FFT generator 406, a first complex conjugator 404, a first multiplier 407, a difference vector multiplier 409, an accumulator 412, a comparator 418 and a timing error estimator 416. The communication system 300 (FIG. 3) transmits information to the receiver using a carrier signal including a plurality of tones. In one exemplary embodiment, the communication system 300 uses a carrier signal comprising 256 tones.

As shown in FIG. 4a, the FFT generator 406 receives a received signal and generates a plurality of complex frequency-domain samples R(n). These complex samples R(n) have a one-to-one correspondence to the plurality of tones used to transmit information in the communication system 300. In one exemplary embodiment, the communication system 300 uses 256 tones, and thus the FFT generator 406 generates 256 complex frequency-domain samples R(n). In one exemplary embodiment, the FFT generator 406 generates the plurality of complex samples in a serial manner. Those skilled in the communications art shall recognize that different means of generating a plurality of complex samples can be used with the present invention without departing from its scope or spirit. For example, the FFT generator 406 can generate the plurality of complex samples R(n) in a parallel manner. The FFT generator inputs the plurality of complex samples R(n) to a first input of the first multiplier 407.

The first complex conjugator 404 receives a plurality of reference samples H(n). The reference samples H(n) represent expected values received from a preamble. Because preambles are pre-determined symbols known to both receivers and transmitters, these values can be determined a priori. In one embodiment, the receiver 3 computes the plurality of reference samples in any well-known manner. The first complex conjugator 404 generates a plurality of reference sample complex conjugates H*(n) in any well-known manner. The first complex conjugator 404 inputs the plurality of reference sample complex conjugates H*(n) to a second input of the first multiplier 407.

The first multiplier 407 receives R(n) and H*(n) from the FFT generator 406 and the complex conjugator 404, respec tively. The first multiplier 407 multiplies these inputs in accordance with the following Equation 1:

$$C(n) = R(n) \cdot H^*(n);\quad \text{(Equation 1)}$$

where n=0, 1, ..., k−1;
k is the number of tones used by the communication system;
R(n) is the $n^{th}$ frequency-domain sample represented by a complex value in rectangular format;
H*(n) is the complex conjugate of the $n^{th}$ reference sample; and
C(n) is the $n^{th}$ resultant vector.

The first multiplier 407 outputs a plurality of resultant vectors C(n) to an input of the difference vector multiplier 409.

The difference vector multiplier 409 receives the plurality of resultant vectors C(n) from the first multiplier 407 and calculates a plurality of difference vectors D(n) according to the following Equation 2:

$$D(n) = C^*(n) \cdot C(n-1);\quad \text{(Equation 2)}$$

where n=0, 1, ..., k−1;
k is the number of tones used by the communication system;
C*(n) is the complex conjugate of the $n^{th}$ resultant vector; and
C(n−1) is the $(n-1)^{th}$ resultant vector.

The difference vector D(n) has an angle that represents the difference between the current tone ($n^{th}$ tone) and the previous tone ($(n-1)^{th}$ tone). A timing error causes a linear phase increment to occur across frequency bands. In channels having a flat phase response, the phase change resulting from the timing error equals the mean of the angle of the difference vector D(n). The difference vector multiplier 409 inputs the plurality of difference vectors D(n) to the accumulator 412. An embodiment of the difference vector multiplier 409 is now described in more detail with reference to FIG. 4b.

Figure 4B:
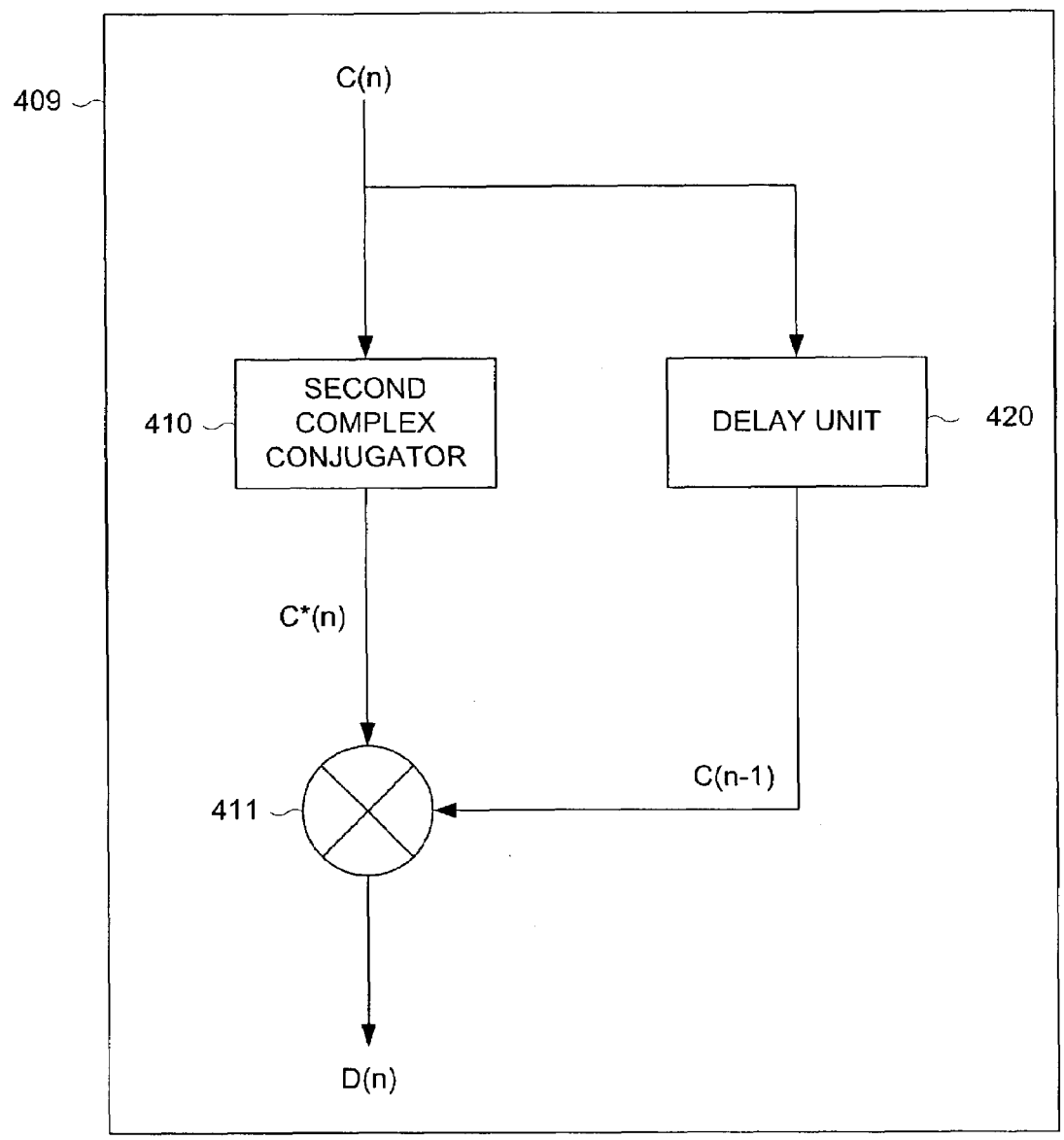

FIG. 4b is a simplified block diagram of one embodiment of the difference vector multiplier 409 of FIG. 4a. As shown in FIG. 4b, the difference vector multiplier 409 includes a second complex conjugator 410, a delay unit 420 and a second multiplier 411. The second complex conjugator 410 receives the plurality of resultant vectors C(n) from the first multiplier 407 and generates a plurality of resultant vector complex conjugates C*(n) in any well-known manner. The second complex conjugator 410 outputs the plurality of resultant vector complex conjugates C*(n) to a first input of the second multiplier 411.

The delay unit 420 receives the plurality of resultant vectors C(n) from the first multiplier 407 and generates a plurality of delayed resultant vectors C(n−1) in any well-known manner. The delay unit 420 outputs the plurality of delayed resultant vectors C(n−1) to a second input of the second multiplier 411.

The second multiplier 411 receives the plurality of delayed resultant vectors C(n−1) from the delay unit 420 and the plurality of resultant vector complex conjugates C*(n) from the second complex conjugator 410. The second multiplier 411 multiplies these inputs according to the Equation 2 given above.

In one embodiment, the second multiplier 411 receives the plurality of delayed resultant vectors C(n−1) and the plurality of resultant vector complex conjugates C*(n) in a serial manner to produce a plurality of difference vectors D(n) in accordance with Equation 2. As shown in FIG. 4a, the difference vector multiplier 409 provides the plurality of difference vectors D(n) to an input of the accumulator 412.

Referring again to FIG. 4a, the accumulator 412 receives the plurality of difference vectors D(n) from the difference vector multiplier 409 and calculates a vector sum, S, in accordance with the following Equation 3:

$$S = \sum_{n=1}^{M-1} D(n) \quad \text{(Equation 3)}$$

Those skilled in the communications art shall recognize that different methods of calculating the vector sum S can be utilized with the present invention without departing from its scope or spirit. For example, the order of operation used to multiply R*(n), R(n−1), H*(n) and H(n−1) and thereby producing the vector sum S can be changed to any number of combinations that are mathematically in accordance with the following Equation 4:

$$S = \sum_{n=1}^{M-1} D(n) = \sum_{n=1}^{M-1} C^*(n) \cdot C(n-1) = \quad \text{(Equation 4)}$$

$$\sum_{n=1}^{M-1} R^*(n) \cdot R(n-1) \cdot H^*(n) \cdot H(n-1)$$

The accumulator 412 generates a magnitude of the vector sum S and provides this information to an input of the comparator 418. The accumulator 412 also generates a phase of the vector sum S and provides this information to an input of the timing error estimator 416.

The timing error estimator 416 receives the phase of the vector sum S and estimates a timing error, k, according to the following Equation 5:

$$k = \frac{N}{2\pi} \cdot \mathrm{atan}\frac{\mathrm{image}(S)}{\mathrm{real}(S)};\quad \text{(Equation 5)}$$

The timing error estimator 416 produces the timing error k and provides the timing error information to an input of the MAC processor 18.

As shown in FIG. 4a, the comparator 418 receives the magnitude of the vector sum S and compares the magnitude with a threshold value. The comparator 418 detects preambles using this information. For example, in one embodiment, the comparator 418 detects a preamble when the magnitude of the vector sum S is greater than or equal to the threshold value. The threshold value can be a predetermined value (e.g., a fixed value obtained from a look-up table) or a dynamically calculated value. The threshold value can be dynamically calculated based on an amount of energy on a channel at a time corresponding to the correlation computation. In one embodiment, the comparator 418 receives the threshold value from the MAC processor 18. The timing error estimator 418 outputs the preamble detection to an input of the MAC processor 18. A second embodiment of the receiver 3 is now described in more detail below with reference to FIG. 5.

Figure 5:
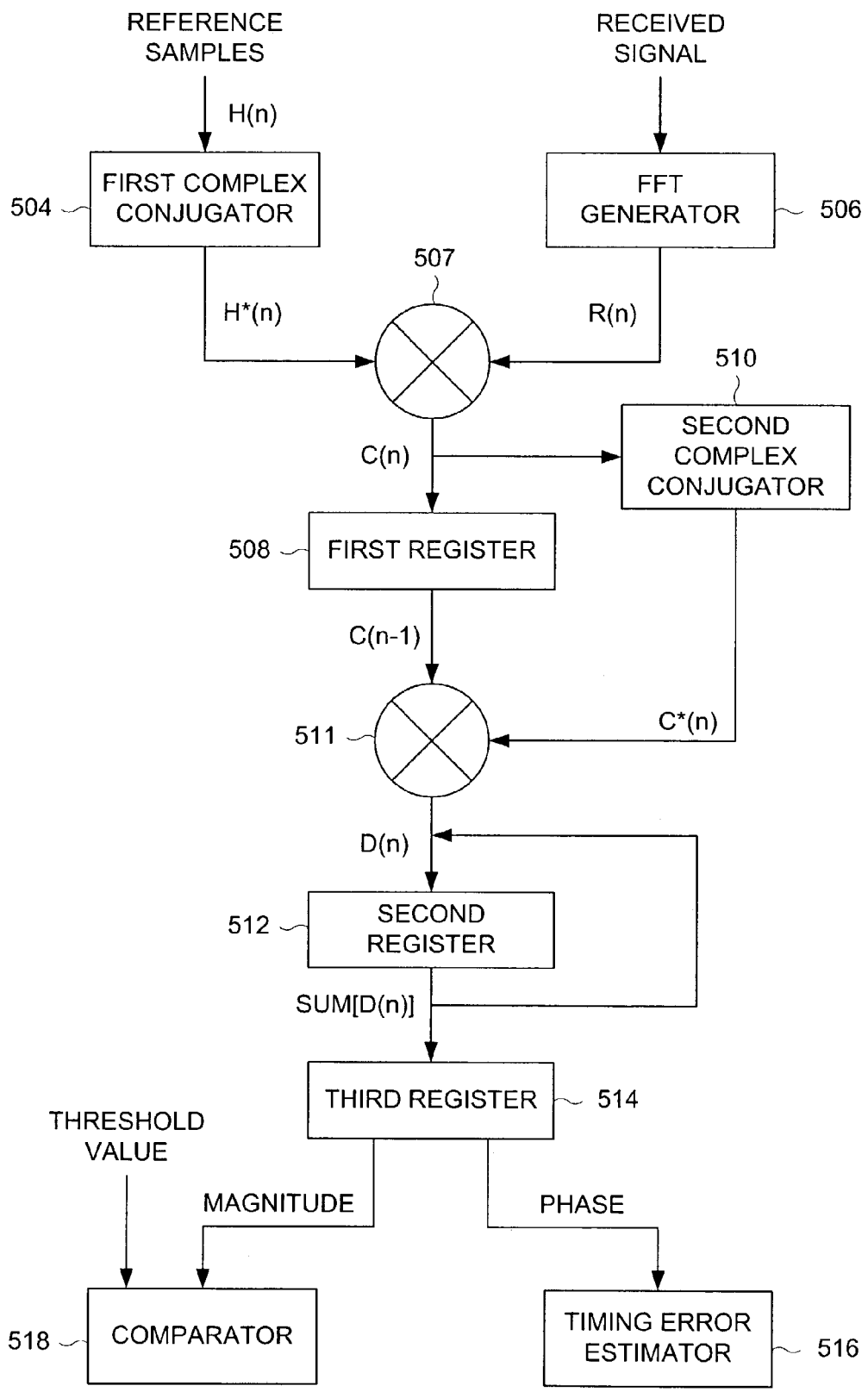
FIG. 5 is a simplified block diagram of another embodiment of an OFDM receiver made in accordance with the present invention.

FIG. 5 is a simplified block diagram of a second embodiment 500 of the present inventive OFDM receiver 3 (FIG. 3) mode in accordance with the present invention. The receiver 500 processes received signals in a serial manner, and thus provides efficient processing of received signals. The second embodiment 500 determines a magnitude and a phase of a vector sum by processing a number of samples that are equal to the number of tones used by the communication system 300 (FIG. 3). The receiver 500 operates similarly to the first embodiment 400 of the receiver, and thus similar components are not described in more detail below. As shown in FIG. 5, the second embodiment 500 includes a first complex conjugator 504, an FFT generator 506, a first multiplier 507, a first register 508, a second complex conjugator 510, a second multiplier 511, a second register 512, a third register 514, a comparator 518 and a timing error estimator 516.

The FFT generator 506 receives a received signal and generates a plurality of complex frequency-domain samples R(n). The complex samples R(n) have a one-to-one correspondence to the plurality of tones used in the communication system 300. The FFT generator 506 outputs the plurality of complex samples R(n) to a first input of the first multiplier 507.

The first complex conjugator 504 receives a plurality of reference samples H(n). The first complex conjugator 504 generates a plurality of reference sample complex conjugates "H*(n)" in any well-known manner. The first complex conjugator 504 outputs the plurality of complex conjugates H*(n) and provides the complex conjugates to a second input of the first multiplier 507.

The first multiplier 507 receives R(n) and H*(n) from the FFT generator 506 and the complex conjugator 504, respectively. The first multiplier 507 multiplies these inputs in accordance with the above-described Equation 1. The first multiplier 507 outputs a plurality of resultant vectors, "C(n)", to inputs of the first register 508 and the second complex conjugator 510.

The first register 508 receives and stores the plurality of vectors C(n). Those skilled in the communications art shall recognize that other memory means, such as random access memories, can be used to practice the present invention. For example, a random access memory can be used to store the plurality of resultant vectors C(n) without departing from its scope or spirit. The first register 508 outputs a previous resultant vector, "C(n−1)", to a first input of the second multiplier 511.

The second complex conjugator 510 receives the plurality of resultant vectors C(n). The second complex conjugator 510 produces and outputs a plurality of resultant vector complex conjugates C*(n) in any well-known manner. The second complex conjugator 510 provides the plurality of resultant vector complex conjugates C*(n) to a second input of the second multiplier 511.

The second multiplier 511 receives the plurality of resultant vectors C(n−1) from the first register 508 and the plurality of resultant vector complex conjugates C*(n) from the second complex conjugator 510. The second multiplier 511 multiplies these inputs in accordance with the above-described Equation 2 to produce a plurality of difference vectors D(n). The second multiplier 511 inputs the plurality of difference vectors D(n) to the second register 512.

The second register 512 sums the difference vectors D(n) to produce a "running" summation of difference vectors D(n). The summation is referred to as "running" because a new difference vector, D(n), is added to the summation during each iteration. The second register 512 provides the running summation to an input of the third register 514. When the last iteration occurs (i.e., when a last sample is processed), the running summation is equal to a vector sum, S, of the difference vectors D(n) (see Equations 3 and 4 above). The third register 514 generates a magnitude of the vector sum S and inputs this information to the comparator 518. The third register 514 stores the vector sum S after the last iteration. The third register 514 also inputs a phase of the vector sum S and inputs this information to the timing error estimator 156.

The timing error estimator 516 receives the phase of the vector sum S and estimates a timing error, k, in accordance with the above-described Equation 5. The timing error estimator 516 produces the timing error k and inputs the timing error to the MAC processor 18.

The comparator 518 receives the magnitude of the vector sum S and compares the magnitude with a threshold value in order to detect a preamble. Preambles are detected as described below in more detail. In one embodiment, the comparator 518 receives the threshold value from the MAC processor 18. The timing error estimator 516 outputs the preamble detection to an input of the MAC processor 18.

Preamble Detection and Time Synchronization Estimation Method

The preamble detection and time synchronization estimation method provides a mechanism for improving preamble detection and providing time synchronization estimations in an OFDM communication system. The inventive method and apparatus utilizes phase and magnitude information obtained from a received signal to detect the presence of preambles and to calculate time synchronization estimations. The present inventive method can be used with the exemplary OFDM communication system described above with reference to FIG. 3. Further, the inventive method can be utilized with any of the embodiments 400, 500 of the receiver 3 described above with reference to FIGS. 4 and 5.

Figure 6:
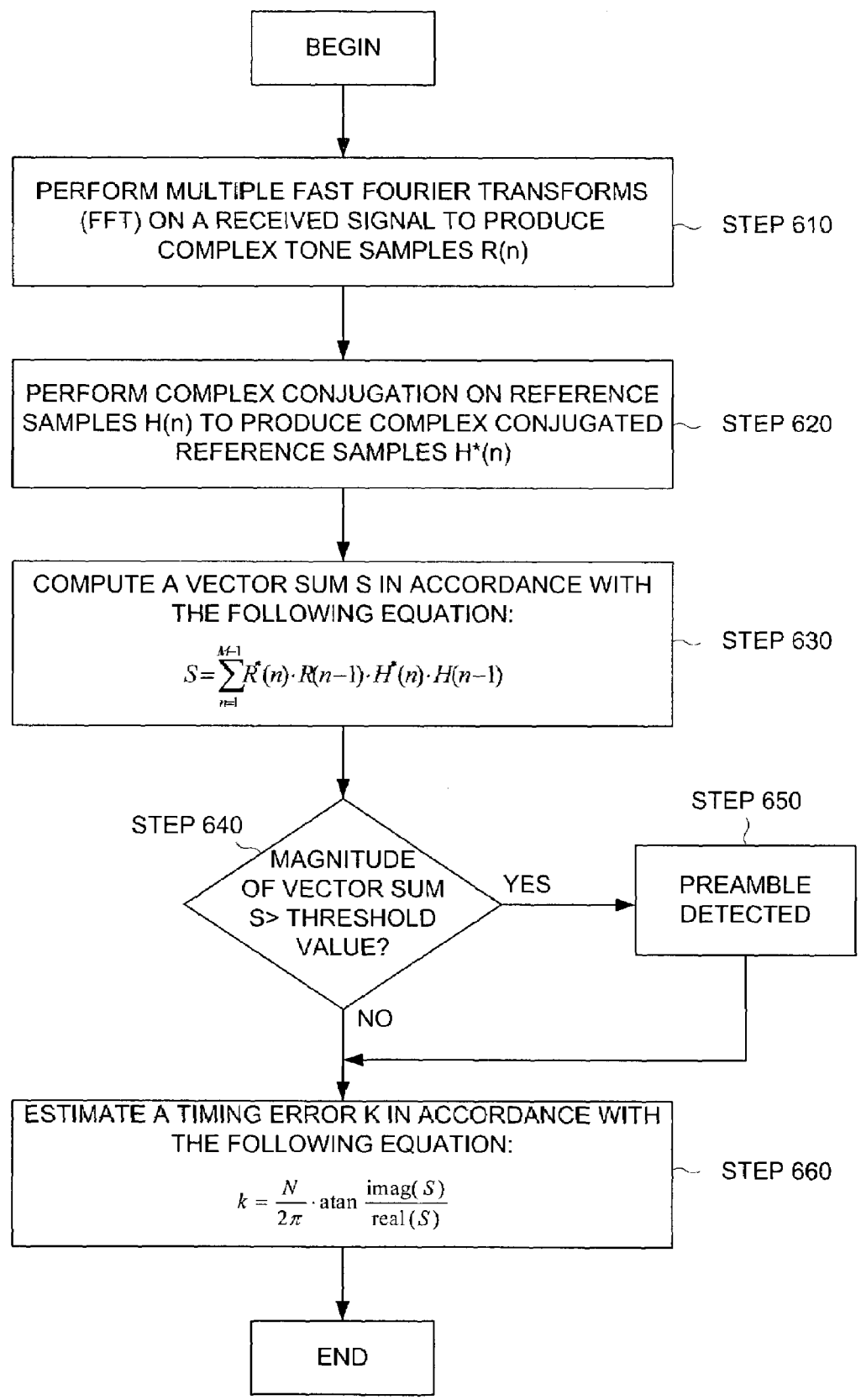
FIG. 6 is a flowchart of a first embodiment of the present inventive method.

FIG. 6 is a flowchart of a first embodiment of the present inventive method. As shown in FIG. 6, the technique of the first embodiment 600 begins at a STEP 610 whereat the method performs multiple Fast Fourier Transforms (FFT) in any well-known manner on a received signal to produce complex tone samples R(n).

After the STEP 610, the method proceeds to a STEP 620 whereat the method performs complex conjugation in any well-known manner on reference samples H(n) to produce complex conjugated reference samples H*(n). The reference samples H(n) represent expected reception values obtained from a preamble, which can be derived a priori in any well-known manner because preambles are pre-determined symbols known to both the receivers and the transmitters.

After the STEP 620, the method proceeds to a STEP 630 whereat the method computes a vector sum S in accordance with the following equation:

$$S = \sum_{n=1}^{M-1} R^*(n) \cdot R(n-1) \cdot H^*(n) \cdot H(n-1);$$

where, M is the number of tones used by the communication system;
R*(n) is the complex conjugate of the $n^{th}$ frequency-domain sample;
R(n−1) is the $(n-1)^{th}$ frequency-domain sample represented by a complex value in rectangular format;
H*(n) is the complex conjugate of the $n^{th}$ reference sample;
H(n−1) is the $(n-1)^{th}$ reference sample.

In one embodiment, the vector sum S is computed in STEP 630 in accordance with the following equation:

$$S = \sum_{n=1}^{M-1} C^*(n) \cdot C(n-1);$$

where, M is the number of tones used by the communication system;

$C(n)=R(n) \cdot H^*(n);$ where n=0, 1, . . . , k−1;

k is the number of tones used by the communication system;

R(n) is the $n^{th}$ frequency-domain sample represented by a complex value in rectangular format;

H*(n) is the complex conjugate of the $n^{th}$ reference sample; and

C*(n−1) is the complex conjugate of the $(n-1)^{th}$ reference sample.

After the STEP 630, the method proceeds to a decision STEP 640 whereat the method determines whether a magnitude of the vector sum S in STEP 630 is greater than a threshold value. The threshold value can be predetermined, or it can be dynamically determined based upon an amount of energy on a channel at a time corresponding with correlation computation. If the method determines at the decision STEP 640 that the magnitude of the vector sum S is greater than the threshold value, the method proceeds to a STEP 650 whereat the method indicates detection of a preamble, else the method proceeds to a STEP 660. After the STEP 650, the method proceeds to the STEP 660.

At the STEP 660, the method estimates a timing error k using the phase of the vector sum S in STEP 630 to estimate a timing error, k, according to the following equation:

$$k = \frac{N}{2\pi} \cdot \operatorname{atan} \frac{\operatorname{image}(S)}{\operatorname{real}(S)};$$

A second embodiment of the present inventive method is now described.

Figure 7:
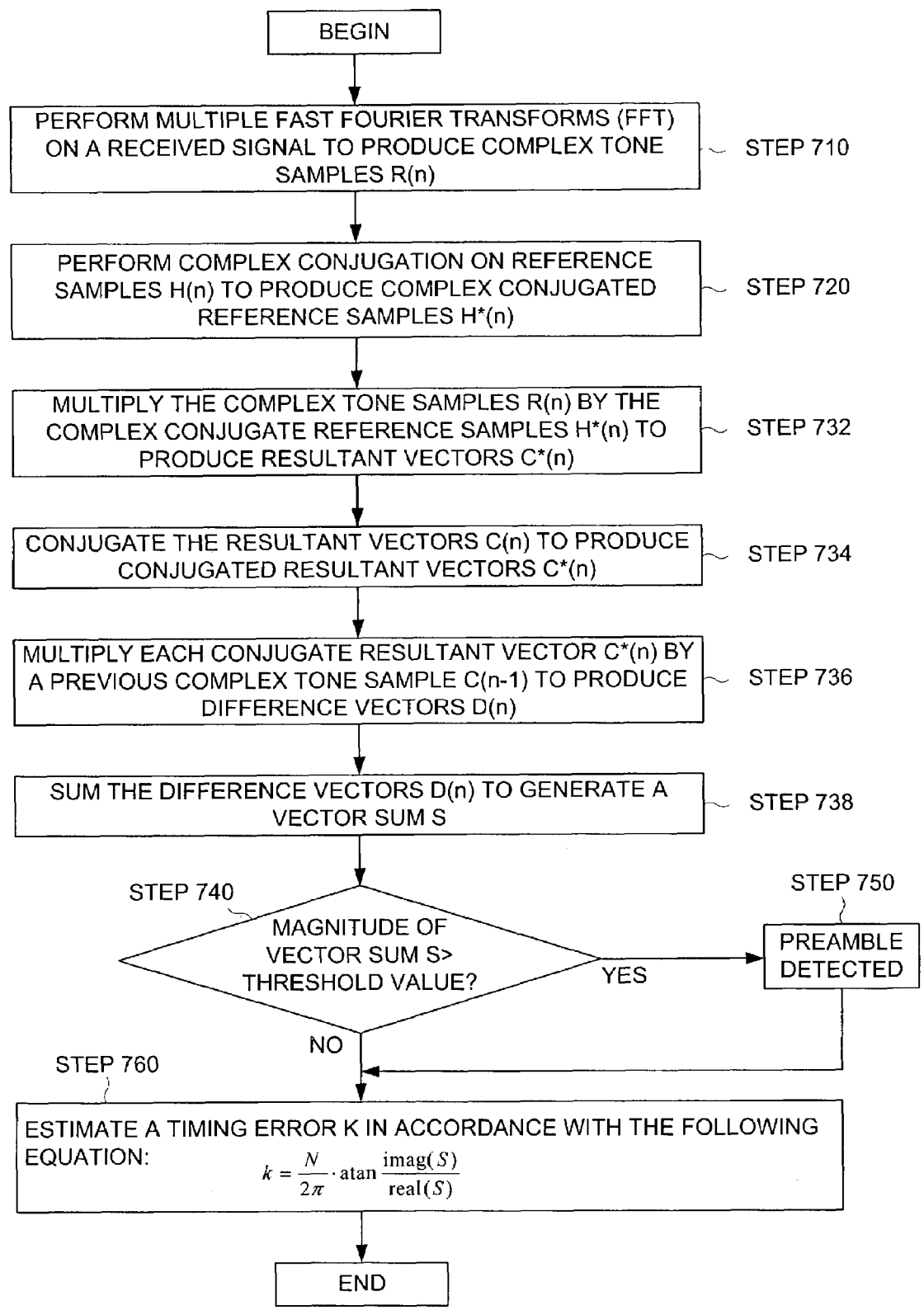
FIG. 7 is a flowchart of a second embodiment of the present inventive method.

FIG. 7 is a flowchart of a second embodiment of the present inventive method. As shown in FIG. 7, the technique of the second embodiment 700 begins at a STEP 710 whereat the method performs multiple Fast Fourier Transforms (FFT) in any well-known manner on a received signal to produce complex tone samples R(n).

After the STEP 710, the method proceeds to a STEP 720 whereat the method performs complex conjugation in any well-known manner on reference samples H(n) to produce complex conjugated reference samples H*(n). The reference samples H(n) represent expected reception values obtained from a preamble, which can be derived a priori in any well-known manner because preambles are pre-determined symbols known to both the receivers and the transmitters.

After the STEP 720, the method proceeds to a STEP 732 whereat the method multiplies the complex tone samples R(n) by the complex conjugate reference samples H*(n) to produce resultant vectors C(n). After the STEP 732, the method proceeds to a STEP 734 whereat the method conjugates the resultant vectors C(n) to produce conjugated resultant vectors C*(n). After the STEP 734, the method proceeds to a STEP 736 whereat the method multiplies each conjugate resultant vector C*(n) by a previous complex tone sample C(n−1) to produce difference vectors D(n). After the STEP 736, the method proceeds to a STEP 738 whereat the method sums the difference vectors D(n) to generate a vector sum S.

After the STEP 738, the method proceeds to a decision STEP 740 whereat the method determines whether a magnitude of the vector sum S in STEP 738 is greater than a threshold value. The threshold value can be predetermined, or it can be dynamically determined based upon an amount of energy on a channel at a time corresponding with correlation computation. If the method determines at the decision STEP 740 that the magnitude of the vector sum S is greater than the threshold value, the method proceeds to a STEP 750 whereat the method indicates detection of a preamble, else the method proceeds to a STEP 760. After the STEP 750, the method proceeds to the STEP 760.

At the STEP 760, the method estimates a timing error k using the phase of the vector sum S in STEP 738 to estimate a timing error, k, according to the following equation:

$$k = \frac{N}{2\pi} \cdot \operatorname{atan} \frac{\operatorname{image}(S)}{\operatorname{real}(S)};$$

The second embodiment operates serially. Thus, the method operates on a sample n before operating on a next sample n+1; where n=0, 1, . . . , k−1; and where k is the number of tones used by the communication system.

The present invention is a method and apparatus for preamble detection and time synchronization estimation in OFDM communication systems. The present invention can be easily implemented to provide preamble detection and highly accurate time synchronization estimations. The inventive method and apparatus utilizes phase and magnitude information from a received signal to detect a preamble and to calculate a time synchronization estimation.

ALTERNATIVE EMBODIMENTS

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents.

A number of embodiments of the present invention have been described. Nevertheless, it will be understood that various modifications may be made without departing from the spirit or the scope of the present invention. For example, the present inventive method and apparatus can calculate the vector sum S utilizing firmware executing on a microprocessor. Alternatively, software can be used to calculate the vector sum S. Therefore, the present invention is not to be limited by the embodiments described, but rather by the scope of the appended Claims.

What is claimed is:

1. A receiver circuit, adapted to receive an input signal from a transmitter in a communication system, comprising:
    (a) an input node capable of receiving an analog input signal and a plurality of reference samples H(n);
    (b) an FFT generator, adapted to receive the analog input signal, wherein the FFT generator generates a plurality of complex frequency domain samples R(n);
    (c) a first complex conjugator, adapted to receive the plurality of reference samples H(n), wherein the first complex conjugator generates a plurality of reference sample complex conjugates H*(n);

(d) a first multiplier, adapted to receive the plurality of complex frequency domain samples R(n) and the plurality of reference sample complex conjugates H*(n), wherein the first multiplier multiplies the plurality of complex frequency domain samples R(n) by the plurality of reference sample complex conjugates H*(n) and generates a plurality of resultant vectors C(n);

(e) a difference vector multiplier, adapted to receive the plurality of resultant vectors C(n), wherein the difference vector multiplier generates a plurality of difference vectors D(n);

(f) an accumulator, adapted to receive the plurality of difference vectors D(n), wherein the accumulator generates a vector sum S and outputs a magnitude and a phase based on the vector sum S;

(g) a timing error estimator, adapted to receive the phase, wherein the timing error estimator generates a timing error k based on the phase; and (h) a comparator, adapted to receive the magnitude, wherein the comparator detects a preamble based on the magnitude.

2. The receiver circuit as defined in claim 1, wherein the plurality of complex frequency domain samples R(n) generated by the FFT generator have a one-to-one correspondence with a plurality of tones utilized by the communication system.

3. The receiver circuit as defined in claim 1, wherein the plurality of reference samples H(n) represents a plurality of expected reception values of the preamble.

4. The receiver circuit as defined in claim 1, wherein the difference vector multiplier generates the plurality of difference vectors D(n) in accordance with the following equation:

$$D(n)=C^*(n)\cdot C(n-1).$$

5. The receiver circuit as defined in claim 1, wherein the difference vector multiplier generates the plurality of difference vectors D(n) in accordance with the following equation:

$$D(n)=R^*(n)\cdot H(n).$$

6. The receiver circuit as defined in claim 1, wherein the difference vector multiplier comprises:

(1) a second complex conjugator, adapted to receive the plurality of resultant vectors C(n), wherein the second complex conjugator generates a plurality of resultant vector complex conjugates C*(n);

(2) a delay unit, adapted to receive the plurality of resultant vectors C(n) and output a plurality of previous resultant vectors C(n−1); and (3) a second multiplier, adapted to receive the plurality of resultant vector complex conjugates C*(n) and the plurality of previous resultant vectors C(n−1), wherein the second multiplier generates a plurality of difference vectors D(n).

7. The receiver circuit as defined in claim 6, wherein the delay unit is a first register.

8. The receiver circuit as defined in claim 1, wherein the timing error estimator generates a timing error k in accordance with the following equation and wherein N is an integer:

$$k = \frac{N}{2\pi} \cdot \operatorname{atan}\frac{\operatorname{image}(S)}{\operatorname{real}(S)}.$$

9. The receiver circuit as defined in claim 1, wherein the accumulator generates the vector sum S by summing the plurality of difference vectors D(n).

10. The receiver circuit as defined in claim 1, wherein the accumulator generates the vector sum S in accordance with the following equation wherein M is the number of tones used by the communications system:

$$S = \sum_{n=1}^{M-1} R^*(n)\cdot R(n-1)\cdot H^*(n)\cdot H(n-1).$$

11. The receiver circuit as defined in claim 1, wherein the accumulator generates the vector sum S in accordance with the following equation wherein M is the number of tones used by the communications system:

$$S = \sum_{n=1}^{M-1} C^*(n)\cdot C(n-1).$$

12. The receiver circuit as defined in claim 1, wherein the comparator detects a preamble when the magnitude is greater than a threshold value.

13. The receiver circuit as defined in claim 12, wherein the threshold value is a predetermined value.

14. The receiver circuit as defined in claim 12, wherein the threshold value is a dynamically calculated value based on an amount of energy on a channel at a time corresponding with computing a phase correlation between possible and theoretical phases.

15. The receiver circuit as defined in claim 1, wherein the plurality of reference samples H(n) represent a plurality of expected reception values of the preamble.

16. The receiver circuit as defined in claim 1, wherein the accumulator comprises:

(1) a second register, adapted to receive the plurality of difference vectors D(n) and a sum of difference vectors, wherein the second register generates the sum of difference vectors by adding a difference vector and a sum of difference vectors; and (2) a third register, adapted to receive the sum of difference vectors, wherein the third register generates the vector sum S based on the sum of difference vectors and outputs the magnitude and the phase based on the vector sum S.

17. A method of preamble detection and time synchronization in an OFDM communication system, wherein the communication system includes a transmitter capable of communicating with a receiver, and wherein the communication system utilizes an OFDM modulation scheme, and wherein the communication system utilizes a plurality of system tones to transmit data, the method comprising:

(a) performing a Fast Fourier Transform (FFT) on an input signal to produce a plurality of complex tone samples, wherein each complex tone sample corresponds to a system tone;

(b) performing complex conjugation on a plurality of reference samples to produce a plurality of complex conjugate reference samples;

(c) multiplying the plurality of complex tone samples by the plurality of complex conjugate reference samples to produce a plurality of resultant vectors;

(d) generating a plurality of difference vectors based on the plurality of resultant vectors;

(e) summing the plurality of difference vectors to produce a vector sum; and (f) utilizing a magnitude and a phase of the vector sum to detect a preamble and estimate time synchronization.

18. The method as defined in claim 17, wherein the plurality of reference samples represents a plurality of expected reception values of the preamble.

19. The method as defined in claim 17, wherein the generating act (d) comprises generating the plurality of difference vectors D(n) in accordance with the following equation:

$$D(n)=C^*(n) \cdot C(n-1).$$

20. The method as defined in claim 17, wherein the generating act (d) comprises generating the plurality of difference vectors D(n) in accordance with the following equation:

$$D(n)=R^*(n) \cdot R(n-1) \cdot H^*(n) \cdot H(n-1).$$

21. The method as defined in claim 18, wherein the summing act (e) comprises generating the vector sum in accordance with the following equation wherein M is the number of tones used by the communications system:

$$S = \sum_{n=1}^{M-1} R^*(n) \cdot R(n-1) \cdot H^*(n) \cdot H(n-1).$$

22. The method as defined in claim 18, wherein the summing act (e) comprises generating the vector sum in accordance with the following equation wherein M is the number of tones used by the communications system:

$$S = \sum_{n=1}^{M-1} C^*(n) \cdot C(n-1).$$

23. The method as defined in claim 18, wherein the utilizing act (f) comprises estimating time synchronization by generating a timing error k in accordance with the following equation and wherein N is an integer:

$$k = \frac{N}{2\pi} \cdot \operatorname{atan} \frac{\operatorname{image}(S)}{\operatorname{real}(S)}.$$

24. The method as defined in claim 17, wherein the utilizing act (f) detects a preamble by determining whether the magnitude is greater than a threshold value.

25. The method as defined in claim 24, wherein the threshold value is a predetermined value.

26. The method as defined in claim 24, wherein the threshold value is a dynamically calculated value based on an amount of energy on a channel at a time corresponding with computing a phase correlation between possible and theoretical phases.

27. The method as defined in claim 17, wherein the generating act (d) comprises the following sub-acts:

(1) conjugating the plurality of resultant vectors to produce a plurality of conjugated resultant vectors; and (2) multiplying the plurality resultant vectors with the plurality of conjugated resultant vectors to produce a plurality of difference vectors.

28. An apparatus, adapted to receive an input signal from a transmitter in a communication system, comprising:

(a) an input means for receiving an analog input signal and a plurality of reference samples H(n);

(b) an FFT generating means, operatively coupled to and responsive to the input means, for generating a plurality of complex frequency domain samples R(n);

(c) a first complex conjugation means for receiving a plurality of reference samples H(n) and generating a plurality of reference sample complex conjugates H*(n);

(d) a first multiplier means, operatively coupled to the FFT generating means and the first complex conjugation means, for generating a plurality of resultant vectors C(n) by multiplying the plurality of complex frequency domain samples R(n) by the plurality of reference sample complex conjugates H*(n);

(e) a difference vector multiplier means, operatively coupled to the first multiplier means, for generating a plurality of difference vectors D(n);

(f) an accumulator means, operatively coupled to the difference vector multiplier means, for generating a vector sum S and outputting a magnitude and a phase based on the vector sum S;

(g) a timing error estimator means, operatively coupled to the accumulator means, for generating a timing error k based on the phase; and (h) a comparator means, operatively coupled to the accumulator means, for detecting a preamble based on the magnitude.

29. An apparatus, comprising:

(a) a transmitter means for transmitting a transmitted signal; and (b) a receiver means for receiving the transmitted signal, comprising:

(1) an input means for receiving an analog input signal and a plurality of reference samples H(n);

(2) an FFT generating means, operatively coupled to and responsive to the input means, for generating a plurality of complex frequency domain samples R(n);

(3) a first complex conjugation means, operatively coupled to and responsive to the input means, for generating a plurality of reference sample complex conjugates H*(n);

(4) a first multiplier means, operatively coupled to the FFT generating means and the first complex conjugation means, for generating a plurality of resultant vectors C(n) by multiplying the plurality of complex frequency domain samples R(n) by the plurality of reference sample complex conjugates H*(n);

(5) a difference vector multiplier means, operatively coupled to the first multiplier means, for generating a plurality of difference vectors D(n);

(6) an accumulator means, operatively coupled to the difference vector multiplier means, for generating a vector sum S and outputting a magnitude and a phase based on the vector sum S;

(7) a timing error estimator means, operatively coupled to the accumulator means, for generating a timing error k based on the phase; and (8) a comparator means, operatively coupled to the accumulator means, for detecting a preamble based on the magnitude.

30. An apparatus, comprising:
    (a) means for performing a Fast Fourier Transform (FFT) on an input signal to produce a plurality of complex tone samples, wherein each complex tone sample corresponds to a system tone;
    (b) means for performing complex conjugation on a plurality of reference samples to produce a plurality of complex conjugate reference samples;
    (c) means, operatively coupled to the performing an FFT means and performing complex conjugation means, for multiplying the plurality of complex tone samples by the plurality of complex conjugate reference samples to produce a plurality of resultant vectors;
    (d) means, operatively coupled to the multiplying means, for generating a plurality of difference vectors based on the plurality of resultant vectors
    (e) means, operatively coupled to the generating means, for summing the plurality of difference vectors to produce a vector sum; and
    (f) means, operatively coupled to the summing means, for utilizing a magnitude and a phase of the vector sum to detect a preamble and estimate time synchronization.

31. A computer readable medium having imparted thereon a plurality of sets of instructions including:
    (a) a first set of instructions for performing a Fast Fourier Transform (FET) on an input signal to produce a plurality of complex tone samples, wherein each complex tone sample corresponds to a system tone;
    (b) a second set of instructions for performing complex conjugation on a plurality of reference samples to produce a plurality of complex conjugate reference samples;
    (c) a third set of instructions for multiplying the plurality of complex tone samples by the plurality of complex conjugate reference samples to produce a plurality of resultant vectors;
    (d) a fourth set of instructions for generating a plurality of difference vectors based on the plurality of resultant vectors;
    (e) a fifth set of instructions for summing the plurality of difference vectors to produce a vector sum; and
    (f) a sixth set of instructions for utilizing a magnitude and a phase of the vector sum to detect a preamble and estimate time synchronization.

* * * * *